(12) United States Patent
Moncur et al.

(10) Patent No.: US 12,066,118 B2
(45) Date of Patent: Aug. 20, 2024

(54) CHECK VALVE WITH INTEGRAL HANDLE

(71) Applicant: Hayward Industries, Inc., Charlotte, NC (US)

(72) Inventors: Christopher Moncur, Pfafftown, NC (US); Paul M. Gutmann, Knoxville, TN (US); Jon T. Stone, Clemmons, NC (US)

(73) Assignee: Hayward Industries, Inc., Charlotte, NC (US)

( * ) Notice: Subject to any disclaimer, the term of this patent is extended or adjusted under 35 U.S.C. 154(b) by 0 days.

(21) Appl. No.: 18/109,746

(22) Filed: Feb. 14, 2023

(65) Prior Publication Data
US 2023/0258276 A1    Aug. 17, 2023

Related U.S. Application Data

(60) Provisional application No. 63/310,551, filed on Feb. 15, 2022.

(51) Int. Cl.
    *F16K 15/03*         (2006.01)
    *F16K 15/18*         (2006.01)
    (Continued)

(52) U.S. Cl.
CPC ........ *F16K 15/1821* (2021.08); *F16K 15/033* (2013.01); *F16K 27/0227* (2013.01); *F16K 31/60* (2013.01)

(58) Field of Classification Search
CPC ............... F16K 15/1821; F16K 15/033; F16K 27/0227; F16K 31/60; F16K 31/602; F16L 23/032
See application file for complete search history.

(56) References Cited

U.S. PATENT DOCUMENTS 253,482 A   *   2/1882   Mixer ..................... F16L 47/04
                                                          285/368
1,000,719 A      8/1911   Cram
(Continued)

FOREIGN PATENT DOCUMENTS

| EP | 2476937 A1 * | 7/2012 | ........... F16K 15/033 |
| WO | 99/32816 A1 | 7/1999 | |
| WO | 2011/047437 A1 | 4/2011 | |

OTHER PUBLICATIONS

Asahi/America, "Wafer Check Valves" Specification sheet, Rev. F, Aug. 2011 (2 pages).
Cepex, "Swing Check Valves" Specification sheet, European Edition, No. 4, Feb. 2007 (1 pages).
Georg Fischer Piping Systems, "Georg Fischer Type 369 Wafer Check Valve" Specification sheet, Jul. 2007 (4 pages).
(Continued)

*Primary Examiner* — Marina A Tietjen
(74) *Attorney, Agent, or Firm* — McCarter & English, LLP

(57) ABSTRACT

A check valve assembly includes a body, a valve assembly configured to engage a port of the check valve assembly, and a handle integrally formed with the body and extending from a substantially cylindrical exterior surface thereof. The handle includes a first vertical support member having a first interior surface, a second vertical support member having a second interior surface, and a horizontal support member that has a third interior surface and extends between the first and second vertical support members. The first, second, and third internal surfaces, and the exterior surface of the body member, define a handle aperture. The first and second interior surfaces of the handle aperture are configured to accommodate first and second bolts of a pipe flange fitting extending through the handle aperture.

11 Claims, 16 Drawing Sheets

(51) Int. Cl.
*F16K 27/02* (2006.01)
*F16K 31/60* (2006.01)

(56) References Cited

U.S. PATENT DOCUMENTS

| | | | | |
|---|---|---|---|---|
| 3,141,686 | A | * | 7/1964 | Smith ..................... F16L 23/12 |
| | | | | 277/621 |
| 4,014,511 | A | | 3/1977 | Uno |
| 4,274,436 | A | | 6/1981 | Smith |
| 4,275,867 | A | | 6/1981 | Schils |
| 4,427,025 | A | | 1/1984 | Prince |
| 4,432,572 | A | * | 2/1984 | Thalmann ........... F16L 23/0283 |
| | | | | 285/368 |
| 4,620,732 | A | * | 11/1986 | Marshall ............... F16L 23/032 |
| | | | | 285/368 |
| 4,852,607 | A | | 8/1989 | Scaramucci |
| 5,671,769 | A | | 9/1997 | Booth et al. |
| 5,713,389 | A | | 2/1998 | Wilson, Jr. et al. |
| 7,249,611 | B2 | | 7/2007 | Scaramucci et al. |
| 7,467,814 | B2 | * | 12/2008 | Kim ..................... F16L 23/032 |
| | | | | 285/412 |
| 8,887,757 | B2 | | 11/2014 | Moren et al. |
| 2005/0121085 | A1 | | 6/2005 | Levey et al. |
| 2008/0179051 | A1 | | 7/2008 | Willis et al. |
| 2015/0076384 | A1 | | 3/2015 | Lurk et al. |

OTHER PUBLICATIONS

Praher Valves, "K4 Swing Check Valve" Specification sheet, 2009 (2 pages).
Praher Valves, "S4 Wafer Check Valve, PVC, PP, PVDF" Specification sheet, Oct. 2008 (2 pages).
Office Action dated Dec. 20, 2013, issued in connection with U.S. Appl. No. 13/418,048 (14 pages).
Notice of Allowance dated Oct. 6, 2014, issued in connection with U.S. Appl. No. 13/418,048 (5 pages).
Extended European Search Report dated Jun. 26, 2014, issued in connection with European Patent Appln. No. 13158691.9 (7 pages).
Mexican Office Action dated Mar. 31, 2015, issued in connection with Mexican Patent Appln. No. MX/a/2013/002756, along with English translation thereof (4 pages).
Australian Examination Report dated Sep. 1, 2016, issued in connection with Australian Patent Appln. No. 2013201218 (3 pages).
Australian Examination Report dated May 11, 2017, issued in connection with Australian Patent Appln. No. 2013201218 (5 pages).
PCT Invitation to Pay Additional Fees dated Apr. 20, 2023, issued in connection with Int'l Application No. PCT/US2023/013044 (2 pages).
PCT International Search Report and Written Opinion dated Jun. 27, 2023, issued in connection with Int'l Application No. PCT/US2023/013044 (11 pages).

\* cited by examiner

CHECK VALVE WITH INTEGRAL HANDLE

RELATED APPLICATIONS

This application claims the benefit of priority to U.S. Provisional Patent Application No. 63/310,551 filed on Feb. 15, 2022, the entire contents of which is incorporated by reference herein.

BACKGROUND

Field of the Disclosure

The present disclosure generally relates to flow control assemblies for fluid systems. More particularly, the present disclosure relates to a check valve having an integral handle.

Related Art

Flow control assemblies for use in fluid systems are known. For example, assemblies utilizing flow control devices (e.g., valves) in fluid systems (e.g., piping systems) have been developed. Flow control assemblies are useful in a myriad of different environments for commercial and industrial applications. Check valves are a type of flow control device and usually include a body component, a disc or flapper component, a means to attach the disc component to the body component, and a seal or seat. These valves typically also include a hinge or shaft, which may be an integral feature of the disc component, or may be a separate component, which for example, is inserted through the disc component and allows the disc to rotate on the shaft. Disc components and shafts are commonly attached to (or retained within) the body of the valve via various means (e.g., via fasteners, retainer rings, threaded bushings, pins, welding, etc.), depending on the design and/or materials of construction of the valve.

FIGS. 1 and 2 show a known wafer check valve assembly 10, positioned between first and second mating flanges 50 of a piping system, and includes a body member 12, a retainer member or end ring member 14, a disc member 16, and a spring member 18 configured to bias the disc member 16 in a closed position (e.g., seated within a port opening 20 of the body member 12, as shown in FIG. 2). The wafer check valve 10 also includes a first gasketing material (e.g., O-ring) 22 positioned within an annular pocket or channel 24 formed between the body member 12 and retainer member 14 that is utilized as a seal therebetween, a second gasketing material (e.g., O-ring) 26 positioned within a groove 28 about a perimeter of the disc member 16 that provides a seal between the disc member and the port opening 20 of the body member 12, a third gasketing material 30 positioned within an annular groove 32 formed on an exterior face 34 of the body member 12, and a fourth gasketing material 36 positioned within an annular groove 38 formed on an exterior face 40 of the retainer member 14. The third and fourth gasketing materials 30, 36 function as seals (e.g., face seals) for sealing the assembly 10 (e.g., body member 12 and retainer member 14) against the mating flanges 50 when the wafer check valve 10 is installed between the flanges 50 in a piping system or the like. The wafer check valve 10 of FIGS. 1 and 2 is described in greater detail in U.S. Pat. No. 8,887,757, the entire disclosure of which is hereby expressly incorporated by reference.

It can be challenging to transport and install check valves, due to their sizes and weights. For example, some ten (10) inch wafer check valves can weigh 25-30 pounds and some twelve (12) inch wafer check valves can exceed 40 pounds. Continuing with the example of wafer check valves, they can have a center of gravity that is not centrally located within the wafer check valve. As such, carrying, positioning, and installing these large wafer check valves can be challenging.

Accordingly, a need remains for improved systems/designs for check valve assemblies for fluid systems. These and other needs are addressed by the check valve of the present disclosure.

SUMMARY

The present disclosure relates to a check valve having an integrally formed handle which aids in portability, manipulation, positioning, and installation of the check valve within a fluid piping system. According to some embodiments, the check valve includes a body member having a port, e.g., an inlet flow port, and a substantially cylindrical exterior surface with an integral handle extending therefrom, a retainer member having a substantially cylindrical exterior surface, and a disc member having a body portion and a shaft member extending therefrom. The body portion of the disc member is configured to be seated within the inlet flow port of the body member in order to create a seal therebetween and the shaft member of the disc member is configured to be rotatably seated within a pocket of the body member. In some embodiments, the retainer member is configured to retain the shaft member within the pocket of the body member, thereby providing for rotation of the body portion of the disc member with respect to the inlet flow port. According to further embodiments, the integral handle includes first and second vertical support members and a horizontal support member extending therebetween. The first vertical support member includes a first interior surface, the second vertical support member includes a second interior surface, and the horizontal support member includes a third interior surface. The first, second, and third internal surfaces and the exterior surface of the body member define a handle aperture, which is configured to accommodate first and second bolts of a pipe flange fitting extending through the handle aperture.

According to further embodiments, the first and second interior surfaces of the handle aperture are configured to engage first and second bolts of a pipe flange fitting extending through the handle aperture, thereby preventing axial rotation of the wafer check valve assembly with respect to the pipe flange fitting. According to some embodiments, the substantially cylindrical exterior surface of the body member can include one or more raised portions positioned radially thereabout and each of the one or more raised portions can also include a scalloped recess configured to engage a bolt of a pipe flange fitting extending through the handle aperture, thereby preventing axial rotation of the wafer check valve assembly with respect to the pipe flange fitting. In some embodiments, the first interior surface of the handle aperture can be aligned with a first scalloped recess of the one or more raised portions and the second interior surface of the handle aperture can be aligned with a second scalloped recess of the one or more raised portions. The handle aperture can be sized and shaped to receive a human hand, a hoisting strap, a chain, a hook, or other means for lifting objects known to those of skill in the art.

BRIEF DESCRIPTION OF THE DRAWINGS

The foregoing features of the disclosure will be apparent from the following Detailed Description, taken in connection with the accompanying drawings, in which.

DETAILED DESCRIPTION

The present disclosure relates to a check valve having an integral handle, as described in detail below in connection with FIGS. 3-16.

Figure 3:
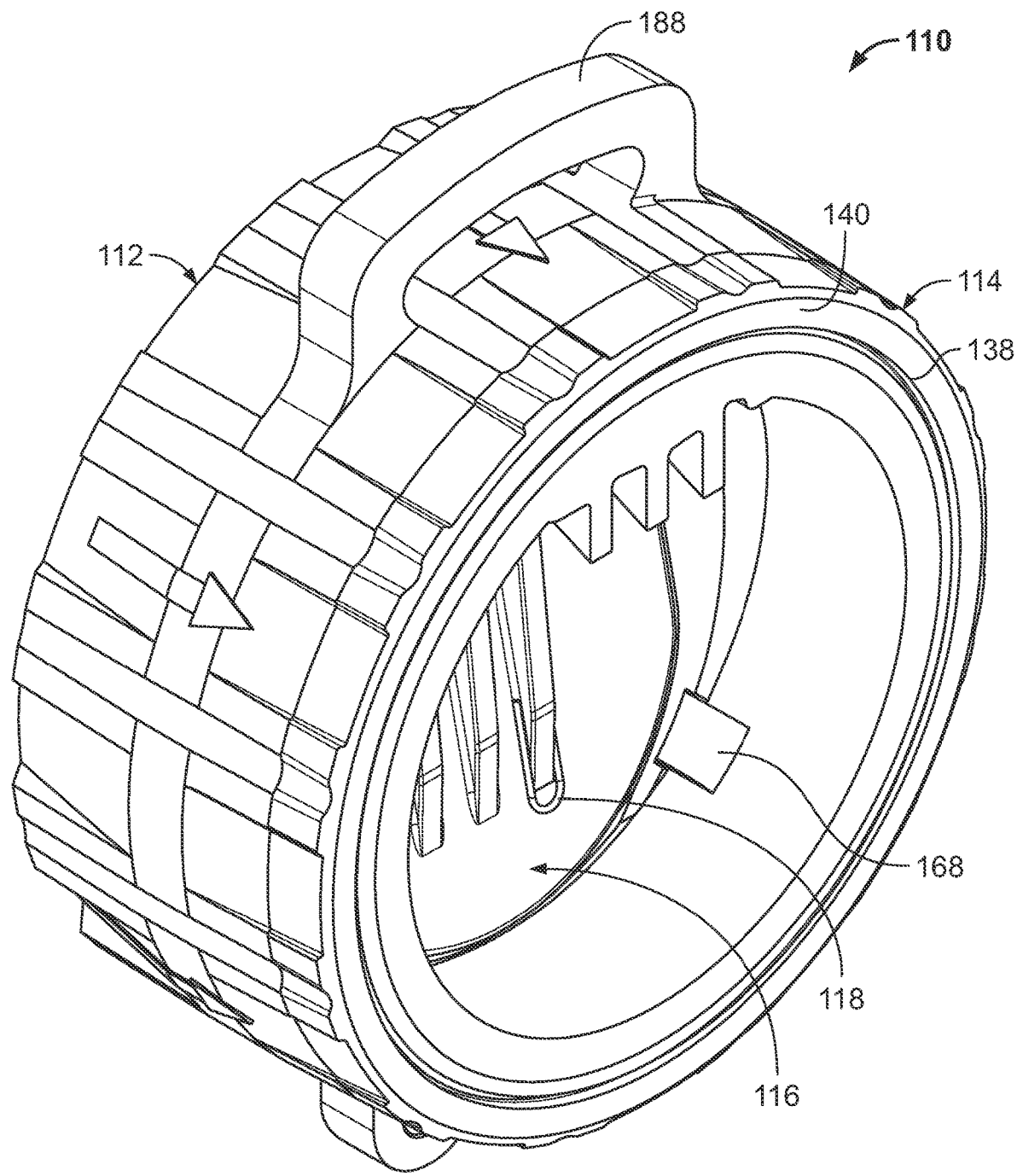
FIG. 3 is a perspective view of a wafer check valve in accordance with an embodiment of the present disclosure.
Figure 4:
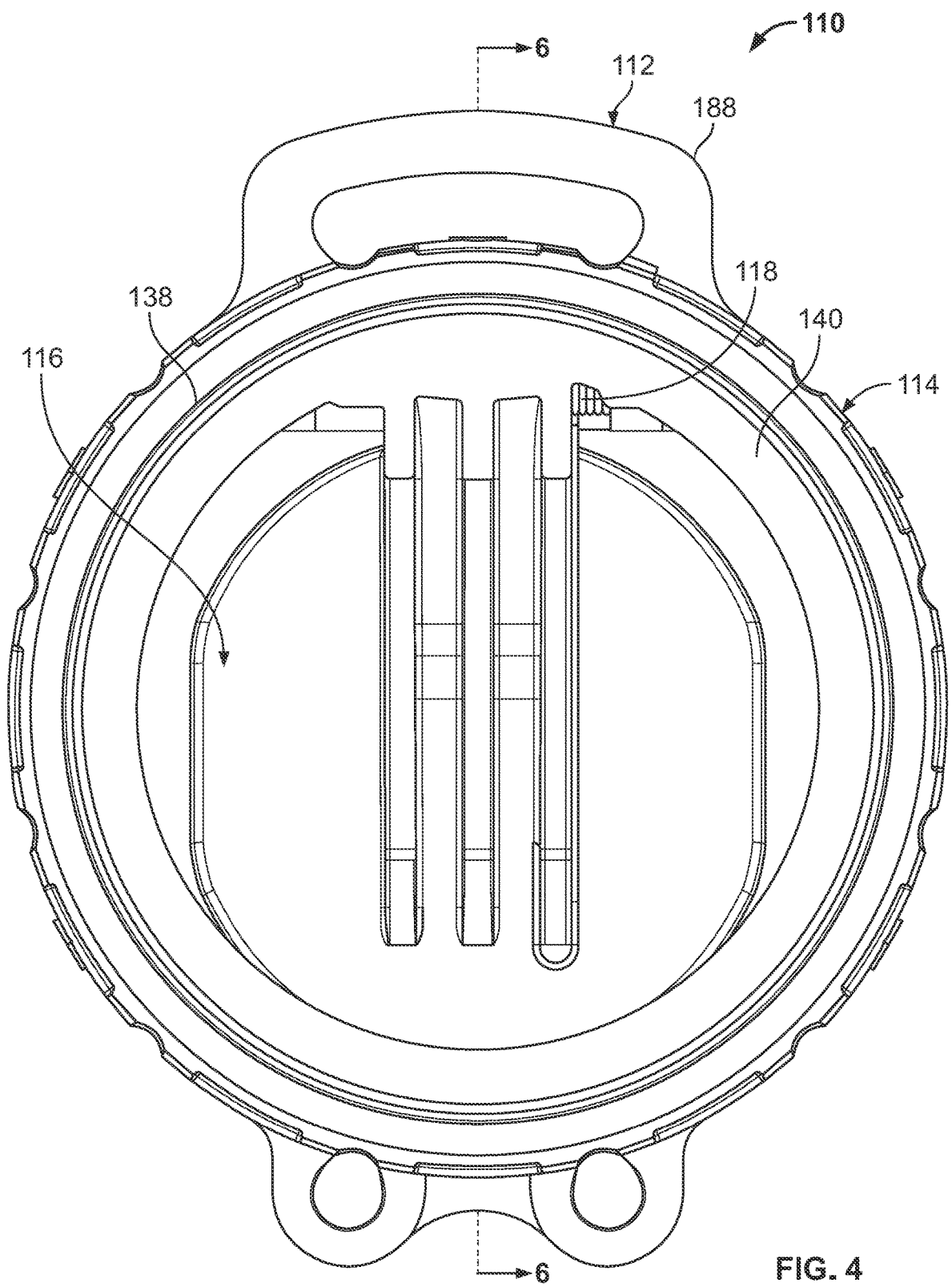
FIG. 4 is a front elevational view of the wafer check valve assembly of FIG. 3.
Figure 5:
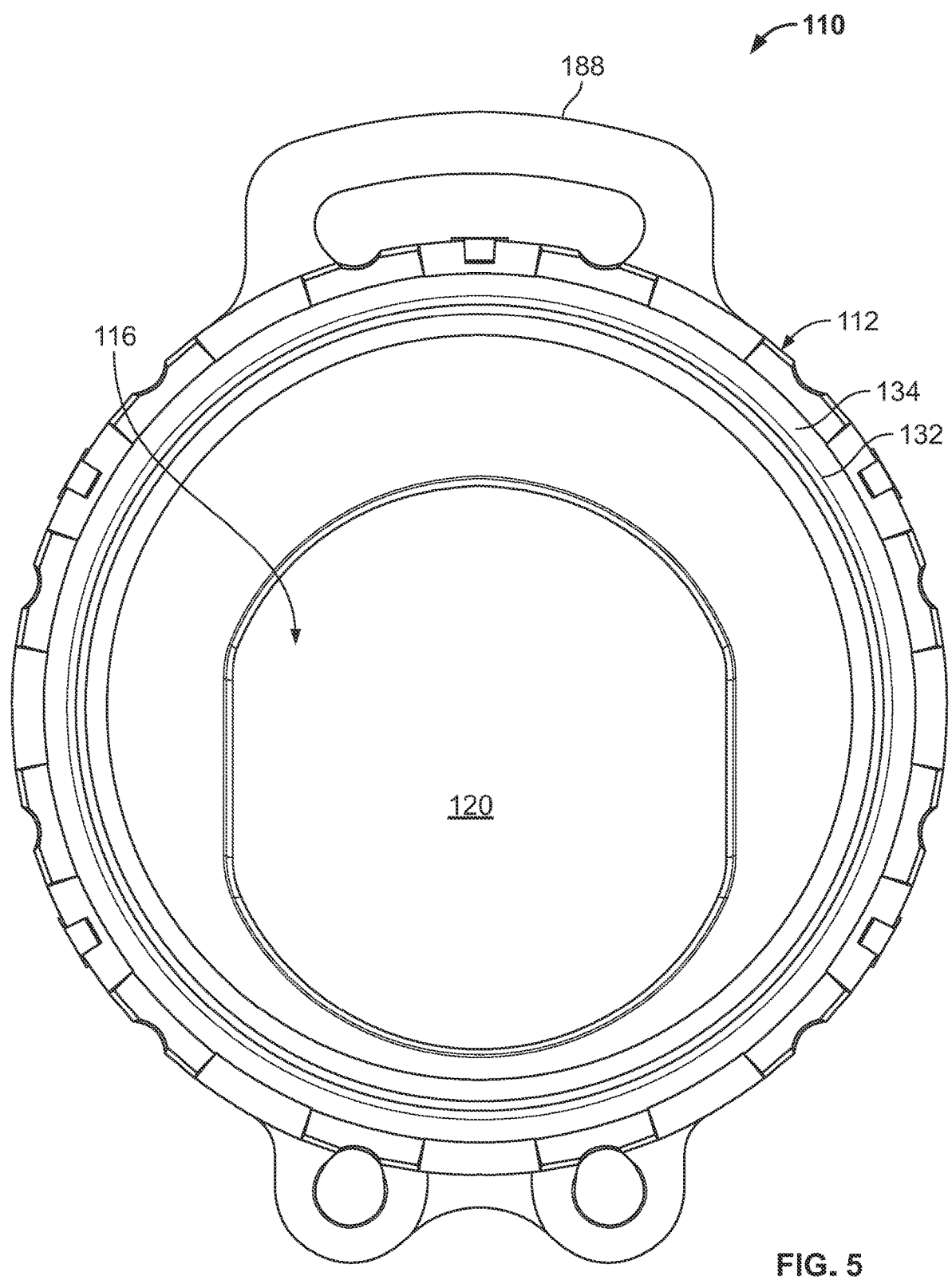
FIG. 5 is a rear elevational view of the wafer check valve assembly of FIG. 3.
Figure 6:
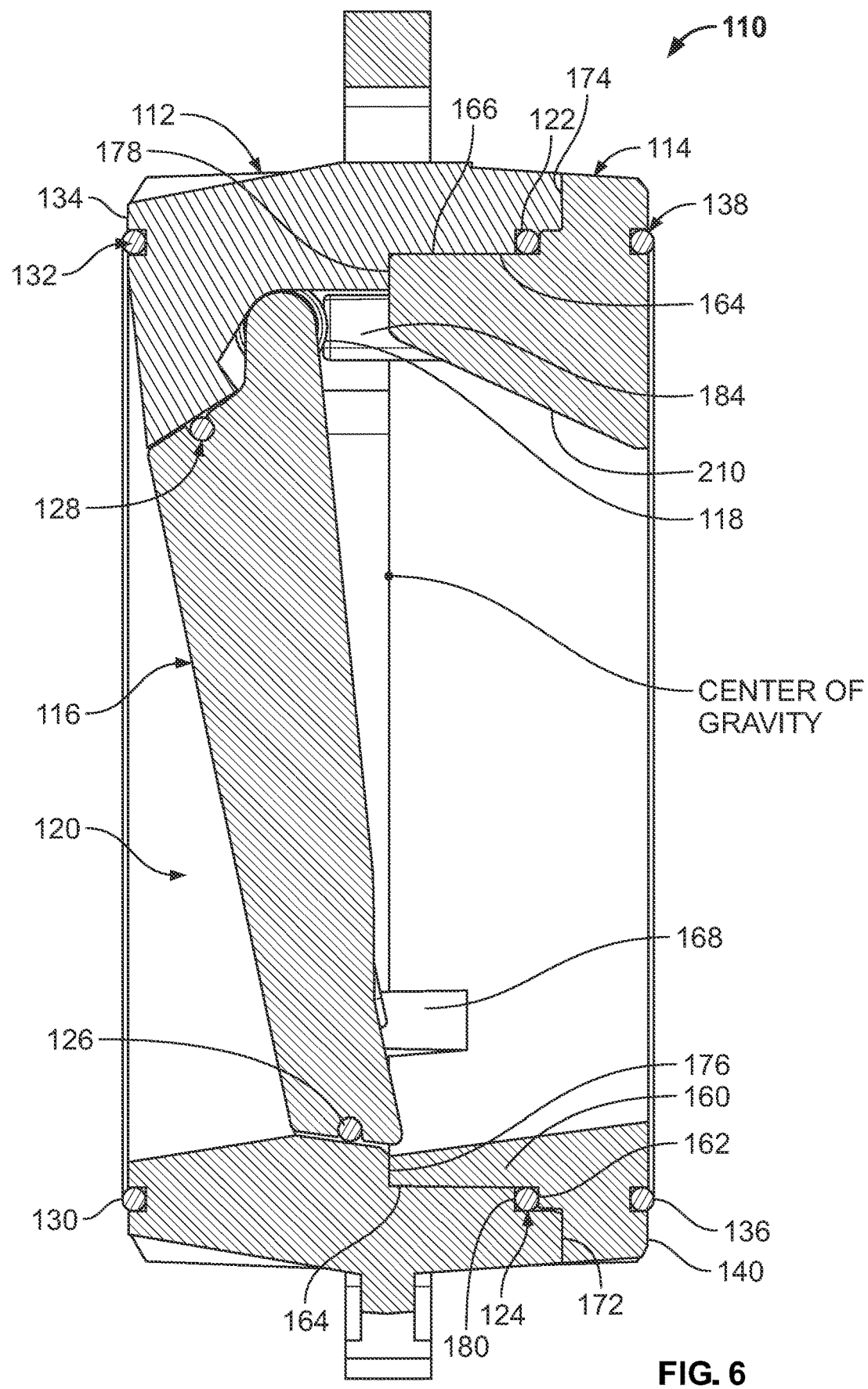
FIG. 6 is a cross-sectional view (taken along line 6-6 of FIG. 4) of the wafer check valve assembly of FIG. 3.

FIGS. 3-6 illustrate a wafer check valve assembly 110 according to the present disclosure, and are referred to jointly herein. Specifically, FIG. 3 is a perspective view of the assembly 110, FIG. 4 is a front elevational view of the assembly 110, FIG. 5 is a rear elevational view of the assembly 110, and FIG. 6 is a cross-sectional view (taken along line 6-6 of FIG. 4) of the assembly 110. The assembly 110 includes a body member 112, a retainer member or end ring member 114, and a disc member 116, and a spring member 118 configured to bias the disc member 116 in a closed position (e.g., seated within a port opening 120 of the body member 112, as shown in FIG. 6). The assembly 110 also includes a first gasketing material (e.g., O-ring) 122 positioned within an annular pocket or channel 124 formed between the body member 112 and the retainer member 114 that provides a seal therebetween, a second gasketing material (e.g., O-ring) 126 positioned within a groove 128 about a perimeter of the disc member 116 that provides a seal between the disc member 116 and the port opening 120 of the body member 112, a third gasketing material 130 positioned within an annular groove 132 formed on an exterior inlet mating face 134 of the body member 112, and a fourth gasketing material 136 positioned within an annular groove 138 formed on an exterior outlet face 140 of the retainer member 114. The third and fourth gasketing materials 130, 136 function as seals (e.g., face seals) for sealing the assembly 110 (e.g., exterior face 134 of body member 112 and exterior face 140 of retainer member 114) against mating flanges 150 (see FIGS. 7-9) when the assembly 110 is installed between the mating flanges 150 in a piping system or the like.

Figure 7:
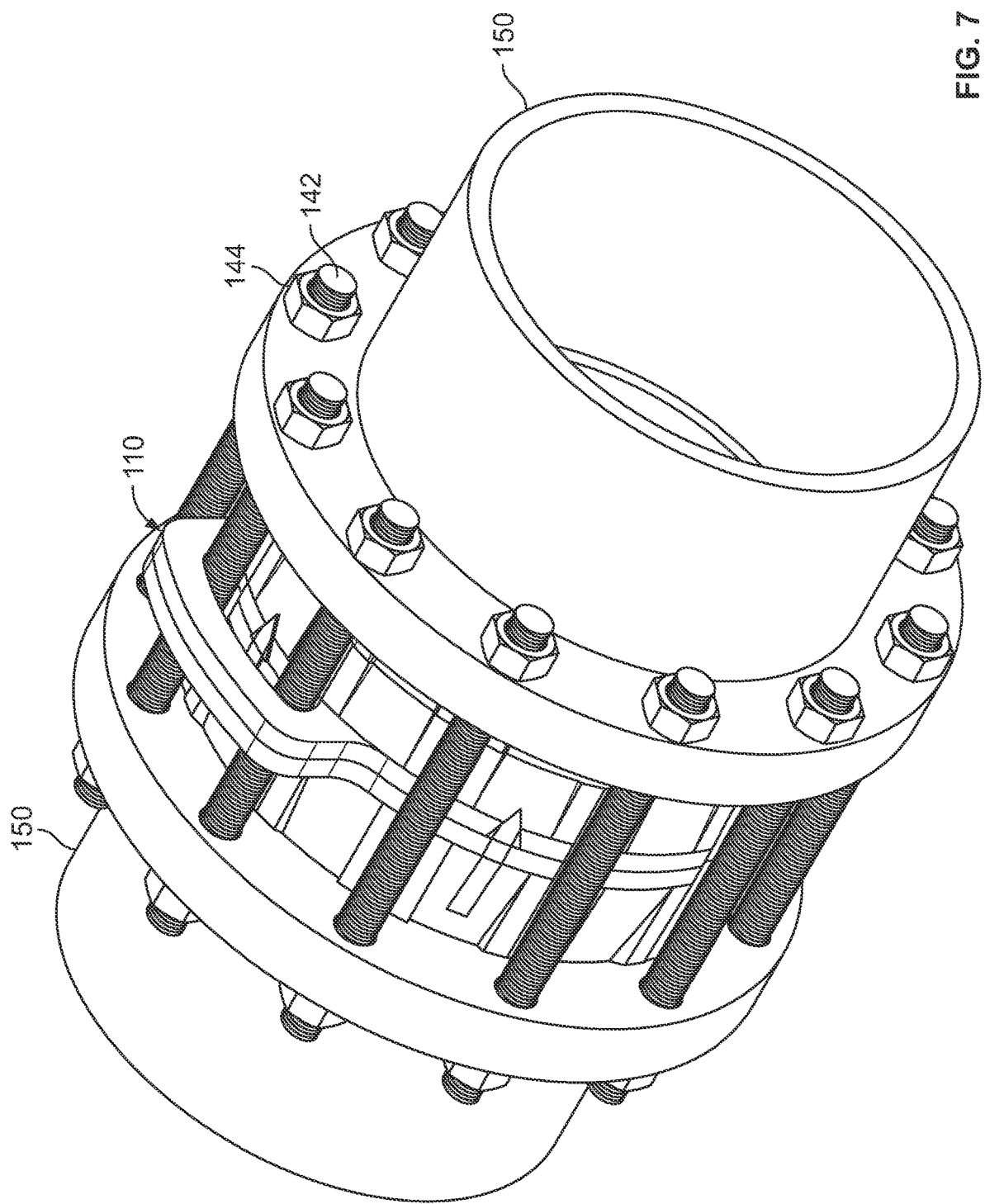
FIG. 7 is a perspective view of an piping system in accordance with the present disclosure, including the wafer check valve assembly of FIG. 3.
Figure 8:
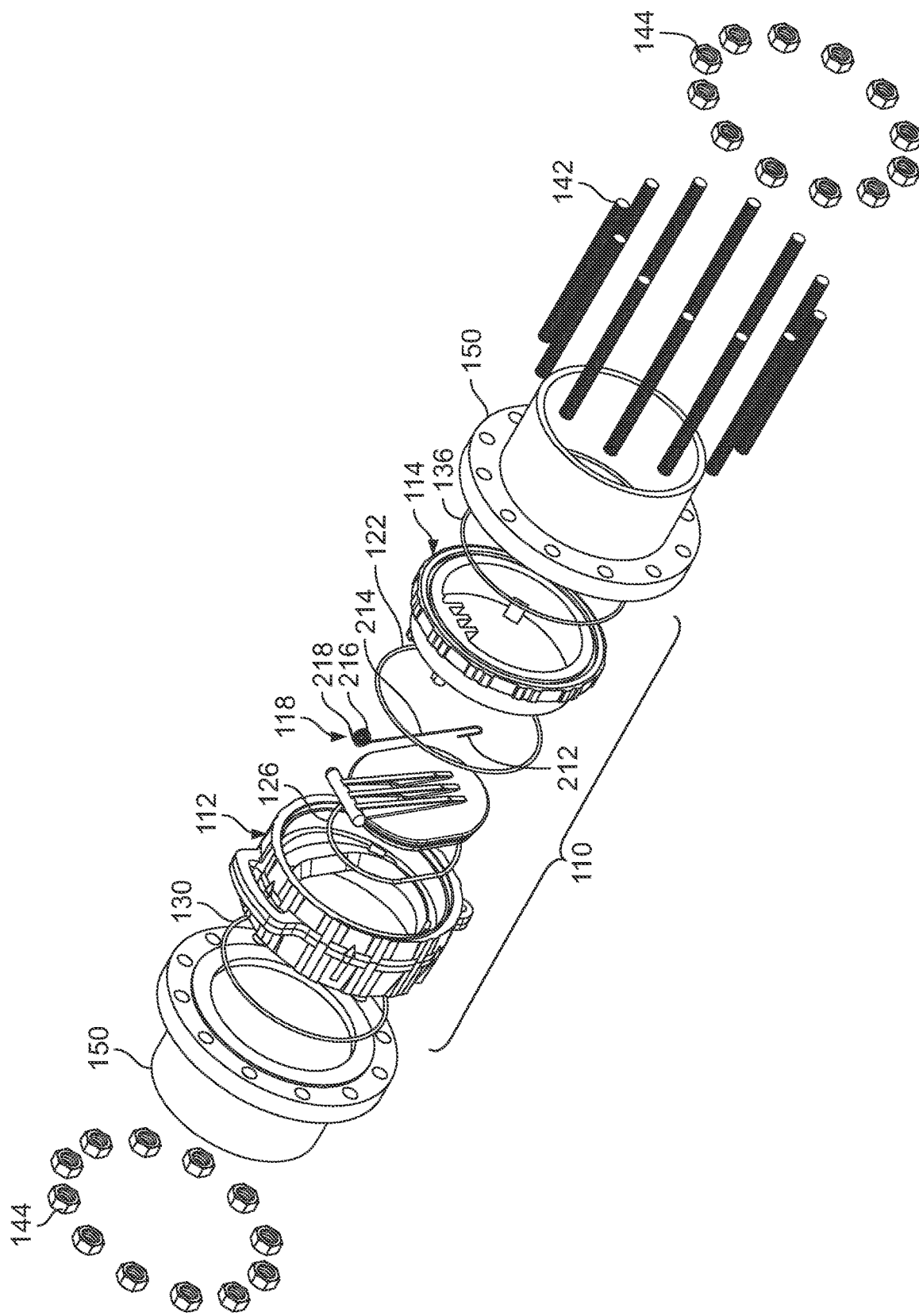
FIG. 8 is an exploded front perspective view of the system of FIG. 7.
Figure 9:
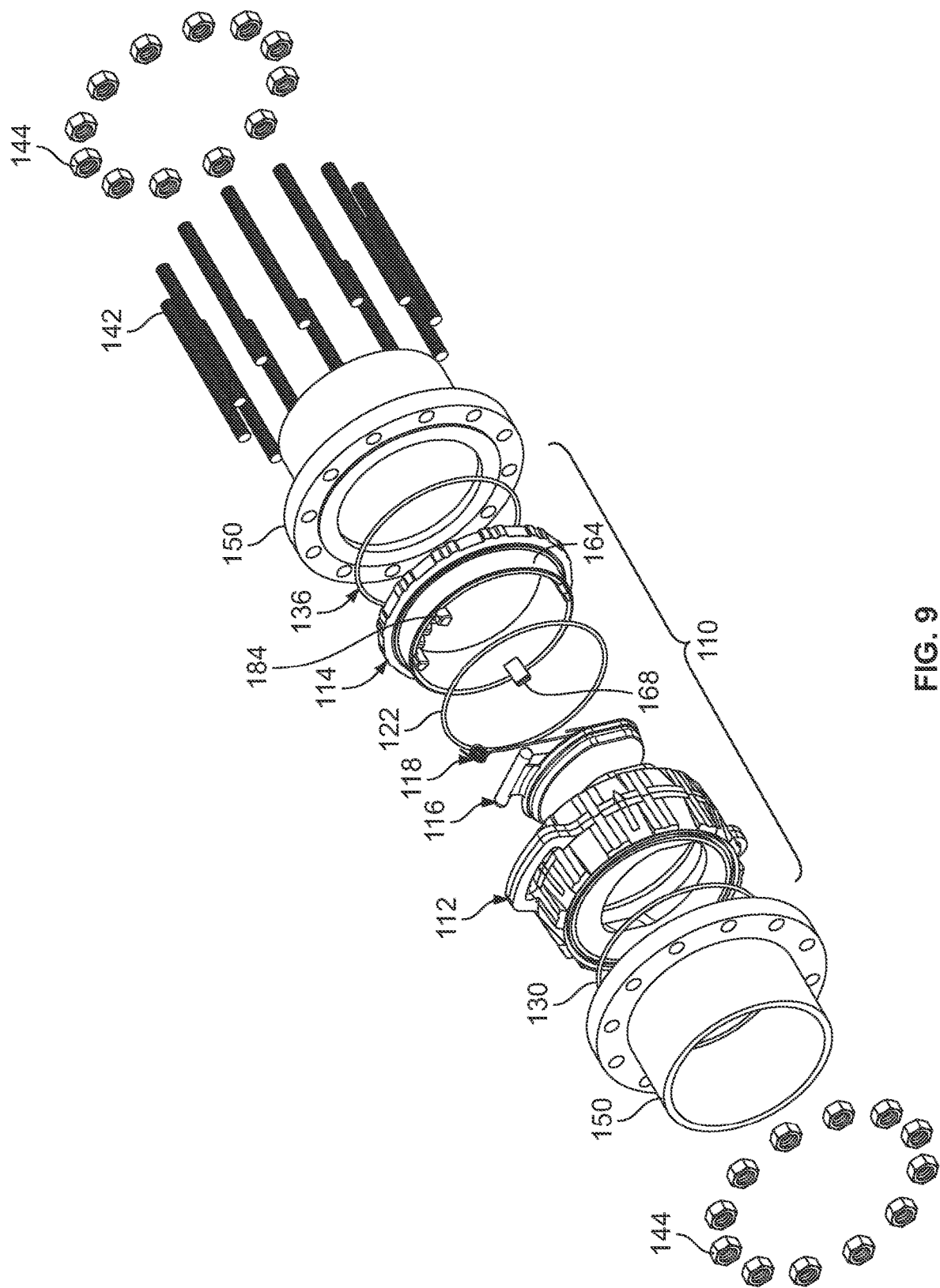
FIG. 9 is an exploded rear perspective view of the system of FIG. 7.

FIGS. 7-9 illustrate installation of the assembly 110 within a piping system. Specifically, FIG. 7 is a perspective view of the assembly 110 secured between mating flanges 150, FIG. 8 is an exploded front view thereof, and FIG. 9 is an exploded rear view thereof. As discussed in greater detail herein, the wafer check valve assembly 110 is secured between the mating flanges 150 by way of a plurality of bolts 142 and hex-head nuts 144. Those of ordinary skill in the art will understand that the bolts 142 and nuts 144 are merely exemplary and other similar fasteners can be substituted in place thereof.

Figure 10:
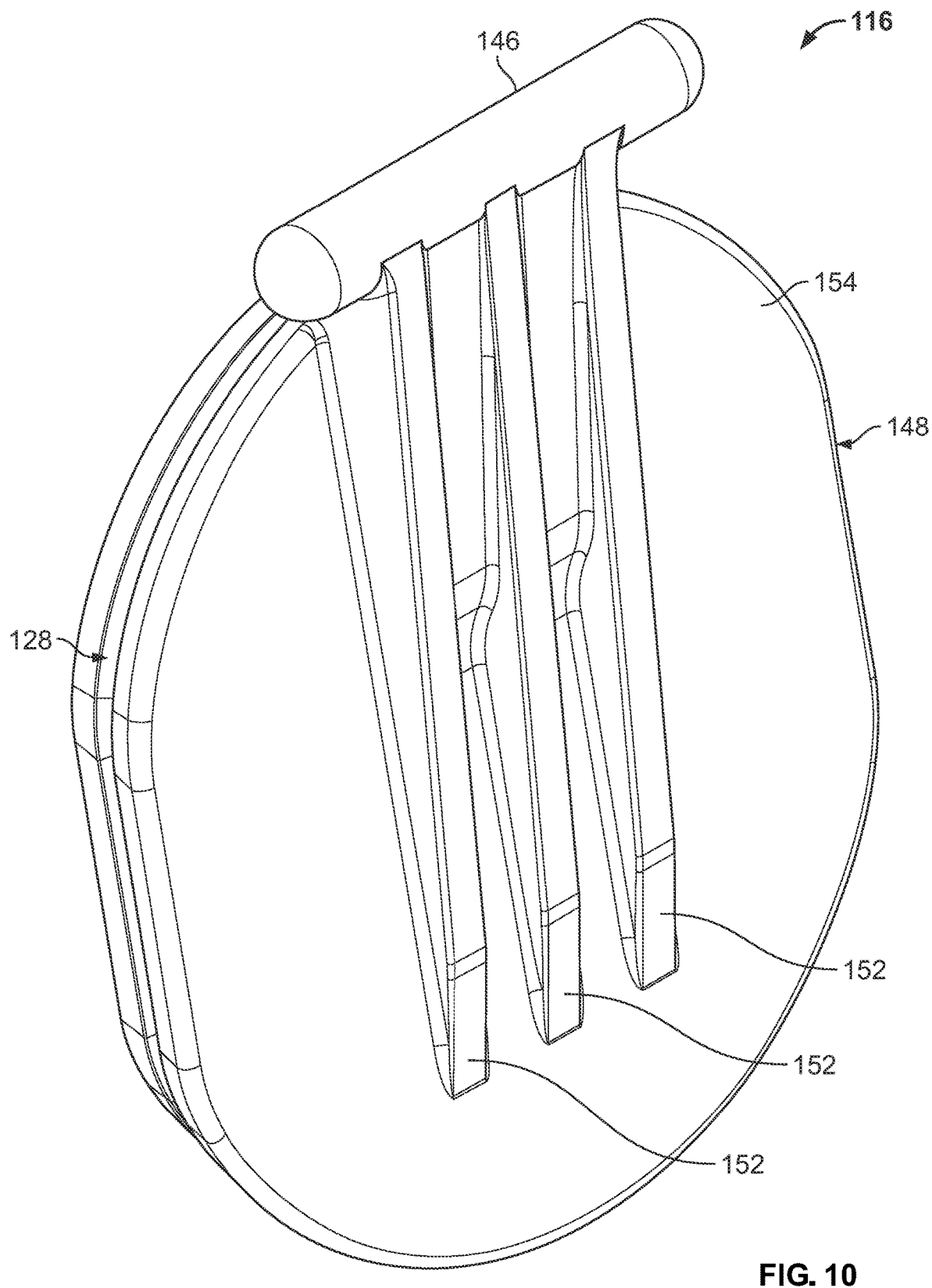
FIG. 10 is perspective view of a disc member of the wafer check valve assembly of FIG. 3.

At least a portion of the second gasketing material 126 is positioned within at least a portion of groove formed in the disc member 116. As shown in FIG. 10, the groove extends around and/or proximal to a perimeter of a body portion 148 of disc member 116. Disc member 116 also includes a shaft member 146 (e.g., integral shaft member) that extends generally perpendicular to one or more flanges 152 protruding from a front face 154 of the body portion 148 of the disc member 116 (see FIG. 10).

The spring member 118 is mounted with respect to (e.g., positioned on and/or around) the shaft member 146 of the disc member 116. At least a portion of the shaft member 146, with the spring member 118 mounted thereto, is positioned within a mating groove or pocket 156 (see FIG. 12) of body member 112 and the body portion 148 of the disc member 116 is positioned/located within the port opening 120 of the body member 112 (see, e.g., FIGS. 3-6). The pocket 156 of body member 112 is sized and shaped to receive at least a portion of the shaft member 146 (e.g., can be cylindrically shaped) and can also include a notch or recess 158 (see FIG. 12) to accommodate the spring member 118 positioned about the shaft member 146.

The first gasketing material 122 is positioned around/over a mating collar 160 of the retainer member 114 and contacts an annular shoulder 162 extending around a base thereof. An exterior mating surface 164 of the mating collar 160 mates with/engages an interior reciprocal (e.g., annular) mating surface 166 of the body member 112 and at least a portion of at least one alignment boss 168 of the retainer member 114 is positioned within at least a portion of at least one pocket or recess 170 of the body member 112 (see FIG. 12), thereby ensuring proper alignment (e.g., rotational alignment) of the retainer member 114 and the body member 112. As shown and described herein, the retainer member 114 includes two alignment bosses 168, and the body member 112 includes two pockets or recesses 170 for receiving same, although the present disclosure is not limited thereto.

The retainer member 114 is engaged/mated with the body member 112 with at least a portion of a mating face 172 of the retainer member 114 engaging, contacting and/or positioned proximal to a mating face 174 of the body member 112, and/or a portion of a mating face 176 of retainer member 114 engaging, contacting and/or positioned proximal to a mating face 178 of the body member 112 (see FIG. 6). Mating faces 172-178 are substantially planar, although the present disclosure is not limited thereto.

Such positioning of the retainer member 114 relative to the body member 112 forms the annular pocket or notch 124 between the annular shoulder 162 of the retainer member 114 and a corresponding annular shoulder 180 of the body member 112. Furthermore, as described above, the annular pocket or notch 124 and the first gasketing material 122 positioned therein cooperate to form a seal between the primary body member 112 and the retainer member 114. The mating pocket/notch 124 can be formed or defined by at least a portion of: (i) the annular shoulder 180 of the body member 112, (ii) an inner annular mating surface 182 (see FIG. 12) of the body member 112, (iii) the annular shoulder 162 of the retainer member 114, and (iv) the annular mating surface 164 (see FIG. 14) of the retainer member 114.

At least one protruding or extending column 184 of the retainer member 114 is positioned proximate to the shaft member 146 of the disc member 116, thereby securing the shaft member 146 within the pocket 156 and allowing rotation of the disc member 116 about a central axis of the shaft member 146 within the pocket 156, while substantially preventing translation of the disc member 116 relative to the port opening 120 of the body 112. The retainer member 114 includes two extending columns 184 positioned generally opposite the alignment bosses 168, although the present disclosure is not limited thereto.

The rotatable disc member 116 can be restrained and/or contained/housed within the retainer member 114/body member 112 without the use of conventional fasteners, and utilizing the first gasketing material 122 positioned within the mating pocket/notch 124 as the primary body member 112/retainer member 114 seal (although the absence of conventional fasteners is not required). The wafer check valve assembly 110 can be utilized in fluid systems as a flow control assembly.

As shown in FIGS. 7-9, the wafer check valve assembly 110 can be mounted with respect to the flanges 150 of a fluid piping system or the like. As discussed in greater detail herein, in connection with FIG. 16, the assembly 110 can be secured to the flanges 150 via one or more bolt apertures 186 and a handle 188 extending from an upper exterior surface 190 of the of the body member 112.

Figure 11:
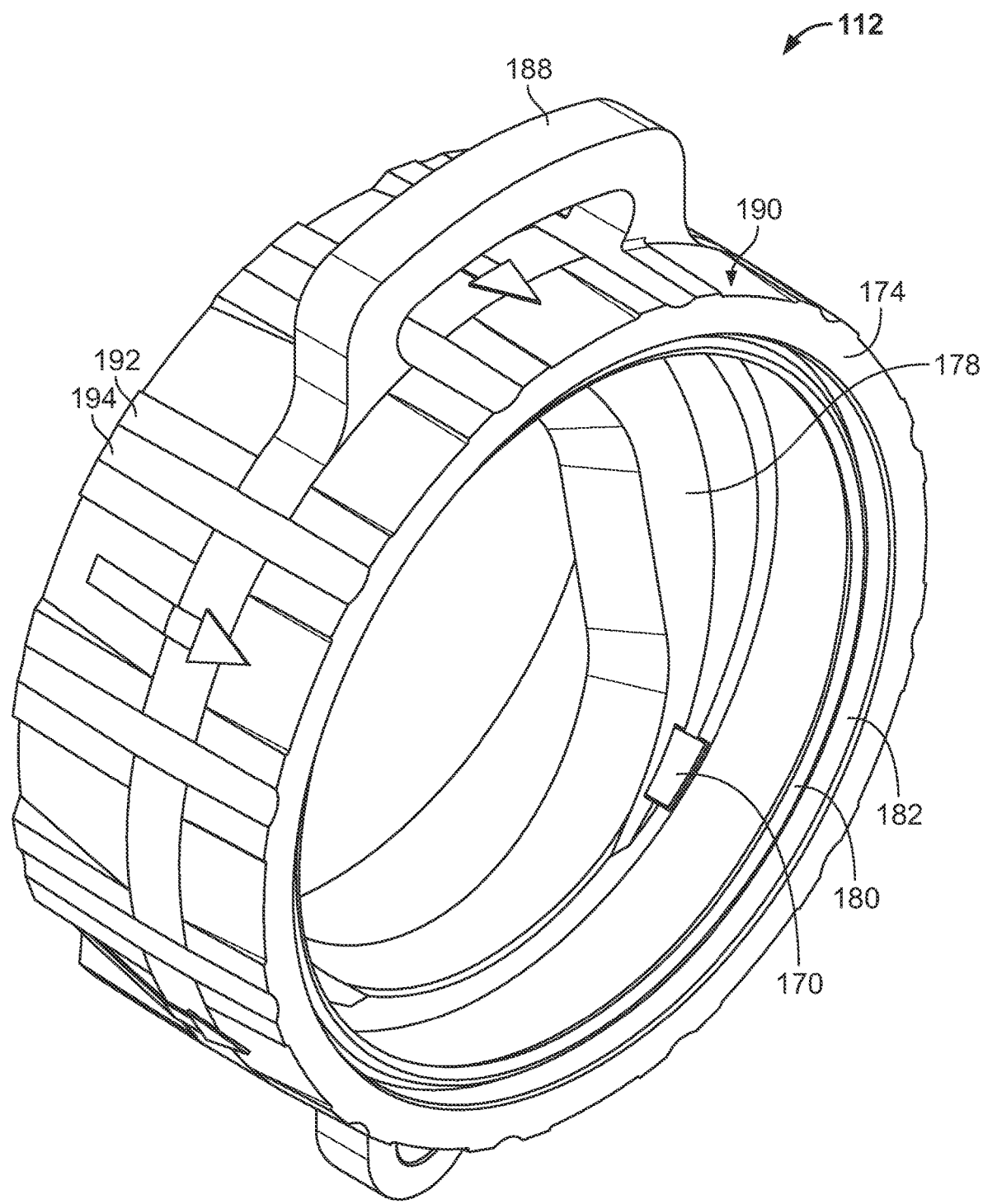
FIG. 11 is a perspective view of a body member of the wafer check valve assembly of FIG. 3.
Figure 12:
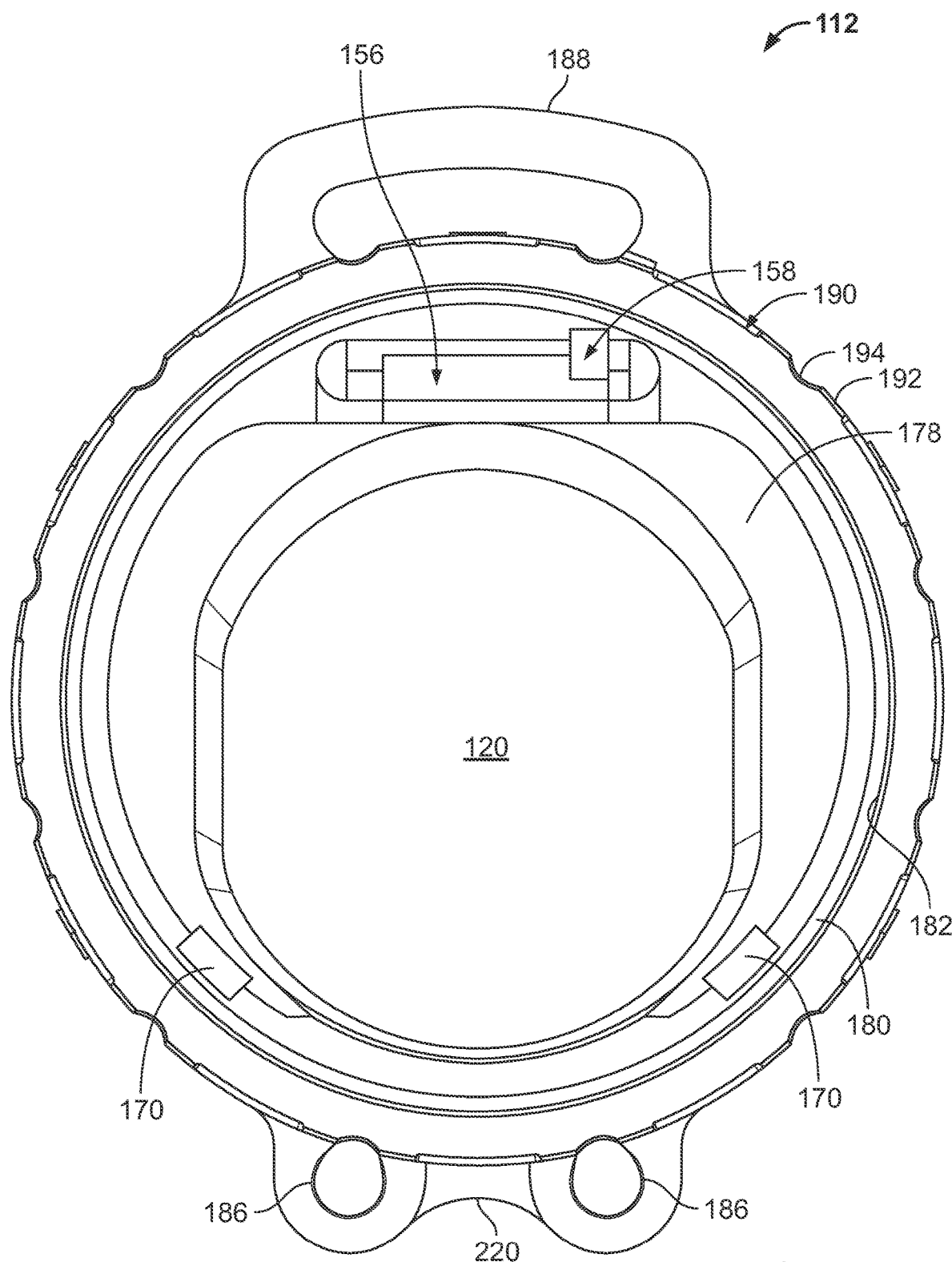
FIG. 12 is a front elevational view of the body member of FIG. 11.
Figure 13:
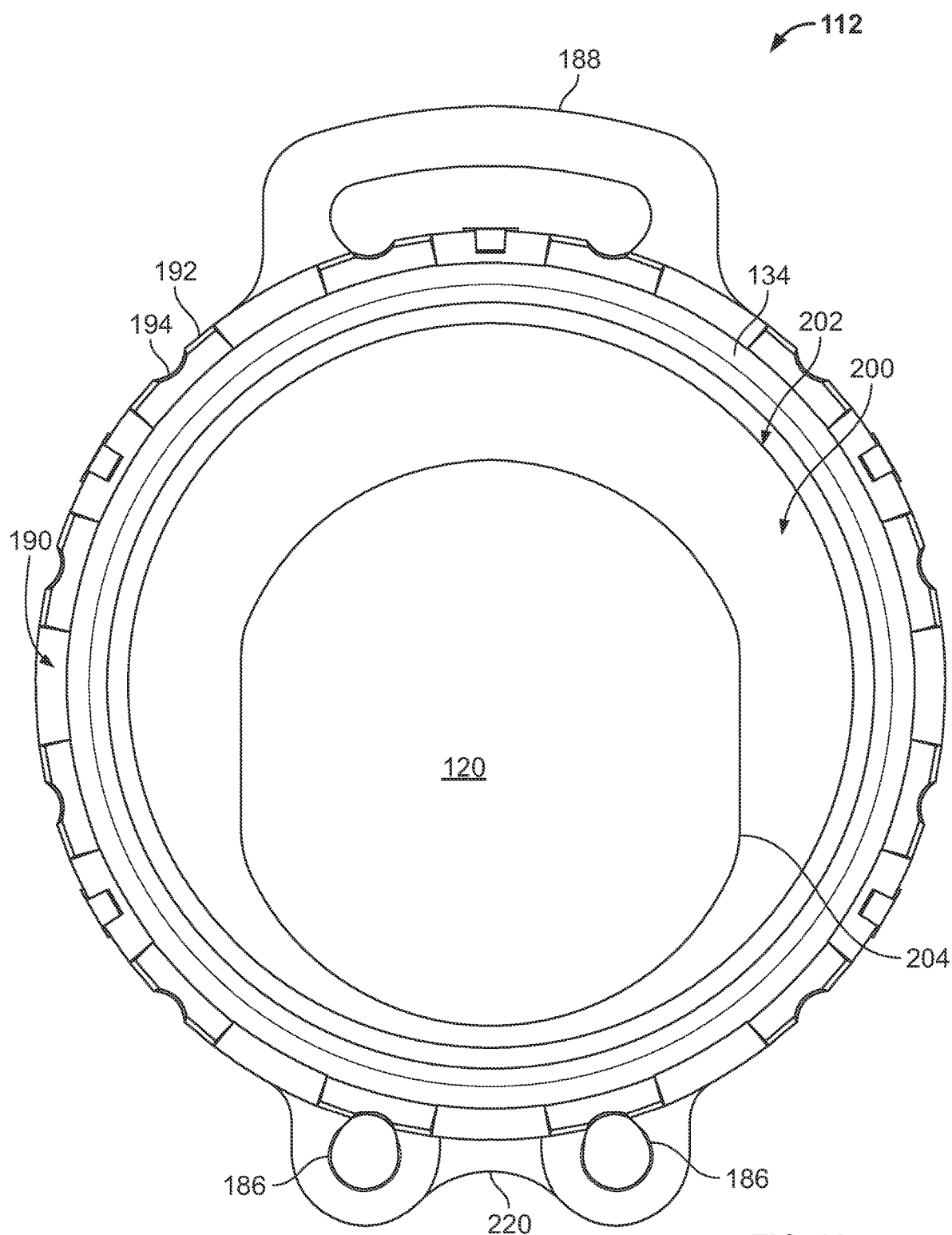
FIG. 13 is a rear elevational view of the body member of FIG. 11.

FIGS. 11-13 show the body member 112 in greater detail and are referred to jointly herein. Specifically, FIG. 11 is a perspective view of the body member 112, FIG. 12 is a front elevational view thereof, and FIG. 13 is a rear elevational view thereof. As shown, the body member 112 is externally substantially cylindrical, although the present disclosure is not limited thereto. Rather, the body member 112 may take a variety of forms. In general, the body member 112 is fabricated from plastic (e.g., thermoplastic), but could be formed from other materials (e.g., metal) based on the requirements of a given piping system application.

The body member 112 includes an exterior or perimeter surface 190 that is substantially cylindrical, which defines the outer perimeter/circumference (e.g., substantially cylindrical or annular outer perimeter/circumference) of the body member 112. A plurality of extended or raised portions 192 are radially positioned about (e.g., equidistantly from one another) the outer surface 190 and generally extend perpendicular to the exterior inlet mating face 134 and the mating face 174 of the body member 112. Furthermore, each of the raised portions 192 includes a scalloped recess 194, also extending perpendicular to the exterior inlet mating face 134 and the mating face 174 of the body member 112. Each raised portion 192 and scalloped recess 194 is configured to substantially align with similar raised portions 196 and scalloped recesses 198 provided radially about an exterior surface of the retainer member 114 when the body member 112 and the retainer member 114 are mated/engaged together, as shown, for example, in FIG. 3. The alignment of the raised portions 192, 196 and the scalloped recesses 194, 198 facilitates proper alignment of the body member 112 with the retainer member 114. Additionally, as described below in connection with FIG. 16, alignment of the raised portions 192, 196 and the scalloped recesses 194, 198 also facilitates engagement of the assembly 110 with the bolts 142 that secure the assembly 110 to the mating flanges 150 of the piping system, thereby preventing axial rotation of the assembly 110 relative to the flanges 150.

With continued reference to FIGS. 11-13, it is noted that the body member 112 is the primary structural component of the assembly 110, including the mating face 174 that is configured and dimensioned to mate/engage with the retainer member 114, and also including the inlet/mating face 134 configured to engage a flange 150 proximate thereto. The groove 132 (e.g., annular groove 132) extends on the inlet mating face 134 of the body member 112, and is positioned between the port opening 120 and the outer surface 190 of the body member 112. The inlet mating face 134 is substantially planar and extends from the outer surface 190 (e.g., inward toward the center of body member 112), although the present disclosure is not limited thereto. Inlet mating face 134 defines a substantially round, cylindrical or annular mating surface.

The groove 132 is configured and dimensioned to house and/or contain at least a portion of the third gasketing material 130. As noted above, the housed gasketing material (e.g., O-ring) 130 is configured to form a seal (e.g., face seal) for sealing the assembly 110 (e.g., for sealing inlet side mating surface 134 of the body member 112) against a mating flange 150 when the assembly 110 is mounted with respect thereto. Body member 112 includes a lower protrusion 220 with first and second bolt apertures 186 extending therethrough.

The body member 112 includes a flow transition area 200. Flow transition area 200 extends and/or tapers/curves from an outer edge 202 of the inlet mating face 134 to an inner edge 204 proximal to port opening 120. The flow transition area 200 is configured and dimensioned to transition, streamline and/or divert fluid flow from a piping system or the like (e.g., from a round pipe sectional area) into and/or through the port opening 120 of the body member 112. In certain embodiments, the port opening 120 is substantially pill shaped, substantially oval shaped, substantially egg shaped and/or substantially tear-drop shaped, although the present disclosure is not limited thereto. The substantially pill/oval/egg/tear-drop shaped port opening 120 advantageously allows an increase in flow area, which results in less resistance to flow through assembly 110. Stated another way, the use of a substantially pill/oval/egg/tear-drop shaped port opening 120 allows for greater flow area as well as a non-centric flow area, resulting in increased flow and less restriction to flow through the assembly 110. The substantially pill/oval/egg/tear-drop shaped port opening 120 also allows for an advantageous disc member 116 shape/geometry, that in turn, allows a greater degree of disc member 116 opening, without contacting/engaging an inside edge of the downstream flange 150 or pipe. It is noted that some conventional valves utilize round disc members which come into contact with the inside edge of a downstream flange or pipe, thereby restricting their degree of opening and further increasing the resistance to flow above that already caused by having a greatly reduced port size. Moreover, the advantageously shaped port opening 120 allows the assembly 110 to be utilized without requiring the installation/assembly of spacers or the like.

As noted above, the mating surface 178 of the body member 112 includes at least one pocket, recess or notch 170

(e.g., rectangular notch or the like). As shown, for example, in FIG. 12, mating face 178 includes two pockets or recesses 170. In some embodiments, the two pockets 170 are positioned: (i) opposite the pocket 156, and (ii) about 90° apart from one another on mating face 178 (e.g., at the 4 o'clock and the 8 o'clock positions when viewing FIG. 12). Each pocket 170 is configured and dimensioned to allow (e.g., mate/engage with) at least a portion of at least one alignment boss 168 of the retainer member 114 (see FIG. 14) to be positioned within at least a portion of each pocket 170 to facilitate proper alignment (e.g., rotational alignment) of the retainer member 114 and body member 112. In general, each mated/engaged pocket 170 and alignment boss 168 facilitate proper orientation of the retainer member 114 relative to the body member 112 during the assembly process, and also substantially prevent rotation of the retainer member 114 relative to the body member 112.

As noted above, at least a portion of shaft member 146 of disc member 116 is configured to be positioned within at least a portion of the mating groove/pocket 156 the body member 112. The groove 156 is a substantially semi-cylindrical groove that extends across at least a portion of mating face 178, opposite the boss pockets 170, into which at least a portion of the shaft member 146 of disc member 116 is configured to be placed/positioned/housed during assembly of wafer check valve assembly 110. The engagement of the at least one column 184 of the retainer member 114 with the disc shaft 146 housed within groove 156 ensures that the disc shaft 146 is fully contained/housed within groove 156. Moreover, while the clearances of groove 156 and/or column 184 are sufficient to allow rotation of disc shaft 146, it is noted that the translation of the disc shaft 146 in the lateral and axial directions is substantially prevented/restricted by the groove 156 and/or engaged columns 184. At least a portion of groove 156 forms/defines the spring groove 158. The spring groove 158 is advantageously configured and dimensioned to accommodate the addition of the spring member 118 or the like to the assembly 110 when/if desired. For example, as discussed below, spring member 118 may be mounted to disc shaft 146 and positioned within the spring groove 158, thereby preventing spring member 118 from slipping off the disc shaft 146 (e.g., due to movement along shaft 146).

Figure 14:
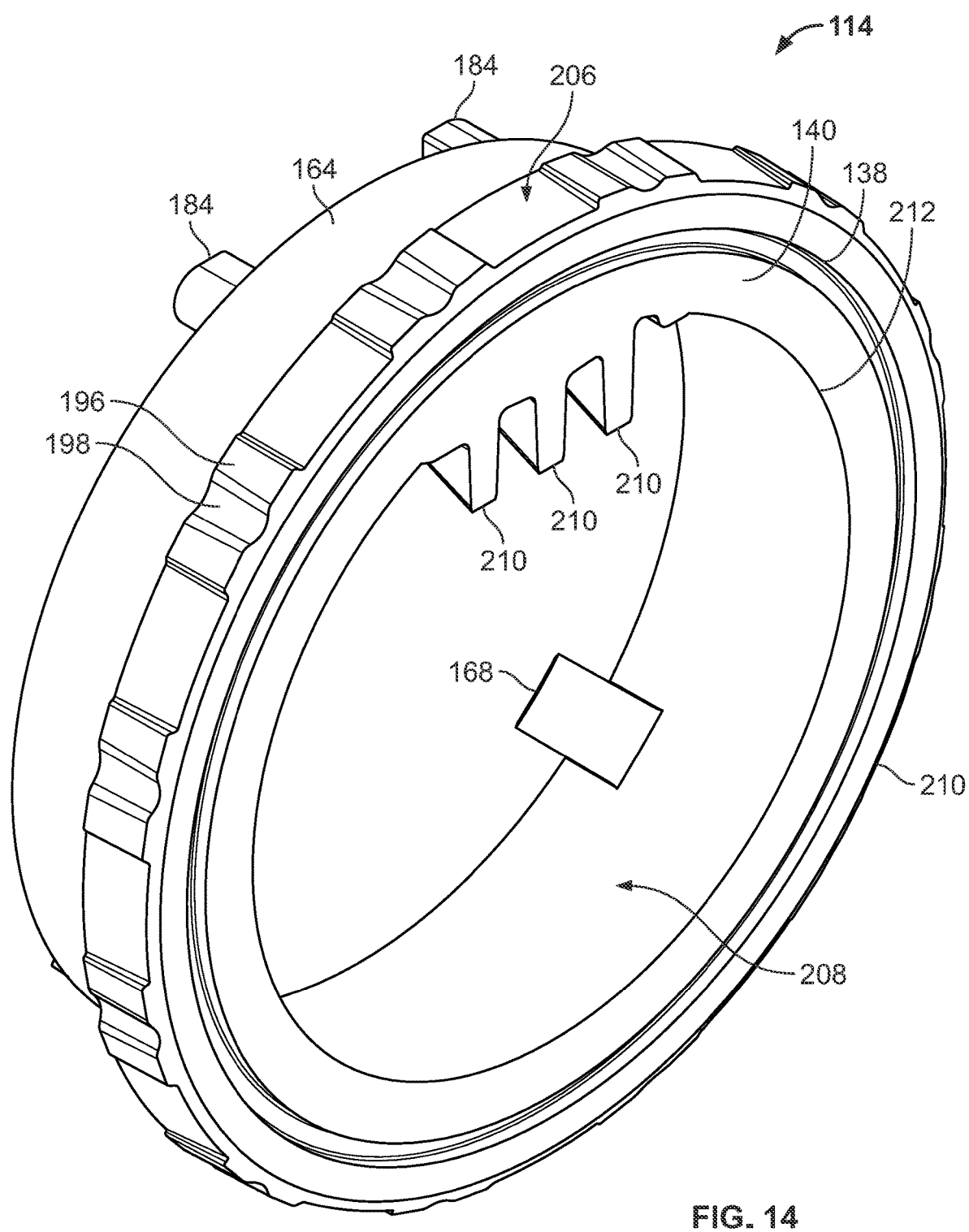
FIG. 14 is a perspective view of a retainer member of the wafer check valve assembly of FIG. 3.
Figure 15:
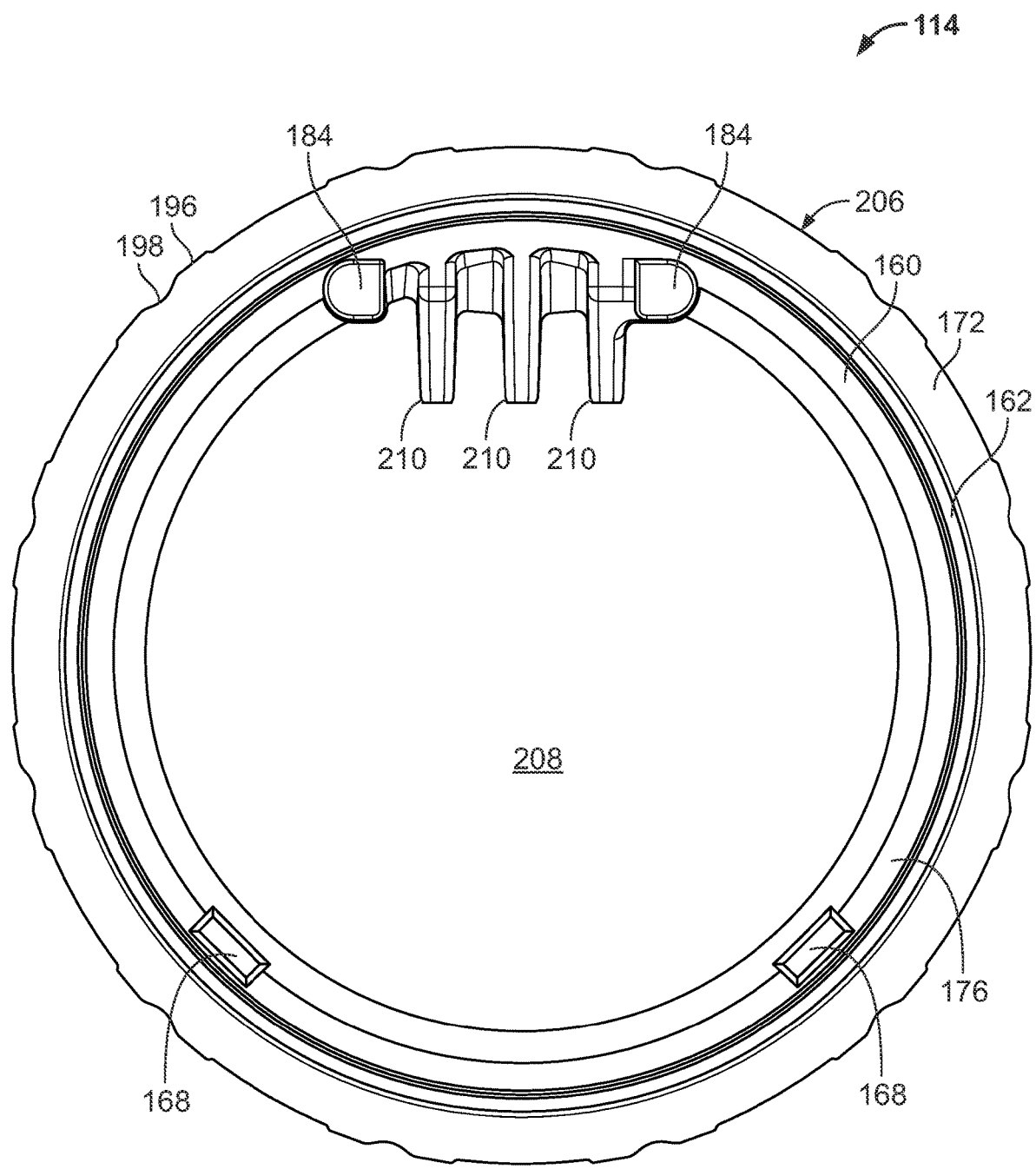
FIG. 15 is a rear elevational view of the retainer member of FIG. 11.

FIGS. 14 and 15 show the retainer member 114 of assembly 110 in greater detail and are referred to jointly herein. Specifically, FIG. 14 is a perspective view of the retainer member and FIG. 15 is a rear elevational view of the retainer member 114. As shown, retainer member 114 takes the form of a substantially externally cylindrical retainer member, although the present disclosure is not limited thereto. Rather, retainer member 114 may take a variety of forms. In general, retainer member 114 can be fabricated from plastic (e.g., thermoplastic), but can also be formed from other materials (e.g., metal) based on the specific requirements of a given piping system application.

The retainer member 114 includes an outer or perimeter portion/surface 206 (e.g., flange portion 206), which substantially defines the outer perimeter/circumference (e.g., substantially cylindrical or annular outer perimeter) of retainer member 114. The outer perimeter/circumference defined by outer surface 206 is substantially equal to the outer perimeter/circumference defined by the outer surface 190 of body member 112 (e.g., when body member 112 and retainer member 114 are engaged/mated together).

As discussed above, outer surface 206 typically includes a plurality of extended or raised portions 196 having scalloped recesses 198 that are positioned radially about (e.g., equidistantly from one another) and extend from outer surface 206. Each raised portion 196 is configured to substantially align with a raised portion 192 of body member 112 when the body member 112 and the retainer member 114 are mated/engaged together. Substantial alignment of raised portions 196 and 192 facilitates proper engagement of body member 112 with retainer member 114, and also facilitates users to grip or grasp assembled wafer check valve assembly 110. Furthermore, each scalloped recess 198 is configured to substantially align with a scalloped recess 194 of body member 112 when the body member 112 and the retainer member 114 are mated/engaged together. As discussed in greater detail in connection with FIG. 16 below, substantial alignment of the scalloped recesses 198 and 194 also facilitates proper engagement with the one or more bolts 142 that secure the assembly 110 between flanges 150 in a piping system, thereby preventing the assembly 110 from axially rotating with respect to the flanges 150.

As noted above, the exterior mating face 140 of the retainer member 114 includes the groove 138. Specifically, the groove 138 (e.g., annular groove 138) is positioned on/within the exterior mating face 140 between a flow opening 208 and the outer surface 206 of retainer member 114. In one embodiment, groove 138 is positioned on/within the exterior mating face 140 at a position that is substantially half-way between an outer edge 210 and an inner edge 212 thereof. Groove 138 is configured and dimensioned to house and/or contain at least a portion of gasketing material 136. As noted above, housed gasketing material (e.g., O-ring) 136 is configured to form a seal (e.g., face seal) for sealing the assembly 110 against a mating flange 150 when the assembly 110 is mounted with respect to a piping system or the like.

With respect to the mating side/face 172 of retainer member 114, the mating surface extends (e.g., inward toward the center of retainer member 114) from outer surface 206 and mating face 172 is substantially planar. In general, mating face 172 is configured and dimensioned to mate/engage with and/or abut against body member 112. In certain embodiments, mating face 172 defines a substantially round, cylindrical or annular mating surface. The annular shoulder 162 extends from the mating face 172 and the mating collar 160 extends from the annular shoulder 162. Additionally, at least one alignment boss 168 (e.g., rectangular boss or the like) and at least one column 184 extend from the mating face 176 that is configured to engage the body member 112. As shown, for example, in FIG. 15, mating face 176 includes two alignment bosses 168 and two columns 184 extending therefrom, although the present disclosure is not limited thereto.

Each boss 168 is configured and dimensioned to be positioned/housed within at least a portion (e.g., mate/engage with) of a pocket 170 of body member 112 to facilitate proper alignment (e.g., rotational alignment) of the engaged retainer member 114 and body member 112. Each column member 184 is configured and dimensioned to engage/interact with at least a portion of disc shaft 146 of disc member 116 when: (i) disc shaft 146 is housed/positioned within groove 156 of body member 112, and (ii) retainer member 114 and body member 112 are engaged/mated together.

Mating face 176 also includes at least one rib member 210. Rib members 210 are generally positioned between the two column members 184, and extends downwardly from the mating face 176 toward the center of flow opening 208 (see FIG. 6). As shown, for example, in FIG. 10, mating face 176 includes three rib members 210 positioned between the two column members 184, although the present disclosure is not limited thereto.

In general, each rib member 210 is configured and dimensioned to engage/interact with at least a portion of a top surface of each flange 152 of disc member 116 when: (i) disc shaft 146 is housed/positioned within groove 156 of body member 112, (ii) retainer member 114 and body member 112 are engaged/mated together, and (iii) disc member 116 is forced to a fully open position. Such engagement advantageously limits the travel of the disc member 116 when the disc member 116 is forced to the open position, and also substantially prevents the disc member 116 from contacting/engaging the inside surface of an adjoining pipe or flange 150. It is noted that the retainer member 114 can include any number of rib members 210 and disc member 116 can include any number of flange members 152.

Referring back to FIG. 8, the assembly can include a spring member 118 with a hook portion 212, a first leg portion 214, and a coil portion 216. The coil portion 216 is positioned about the shaft 146 of the disc member 116 and the hook portion 212 extends around and engages one of the flange members 152 of the disc member 116 and substantially prevents the leg portion 214 of spring member 118 from floating or moving from side to side as the disc member 116 is opened and closed. The spring member 118 is a torsion/coil spring or the like, although the present disclosure is not limited thereto.

At least a portion of a second leg portion 218 of spring member 118 engages and/or is housed/positioned within the spring groove 158 of body member 112, when the shaft 146 of the disc member 116 is mounted within the groove 156. In general, at least a portion of the coil portion 216 defines the geometry of the spring groove 158. When disc member 116 is mounted with respect to body member 112, at least a portion of second leg portion 218 is engaged against body member 112 (e.g., spring groove 158). As such, under full system operation of assembly 110, the spring member 118 acts as a dampener to substantially prevent the disc member 116 from slamming into the open position. Moreover, when the system of operation of assembly 110 is shut down, the spring member 118 biases the disc member 116 toward the closed position (e.g., as shown in FIG. 6) so that the disc member 116 closes faster than would normally occur with only gravitational reversal of fluid flow. Spring member 118 also aids assemblies 110 installed in substantially horizontal piping systems to achieve a seal, again by biasing the disc member 116 toward the closed position. It is to be noted that the intended function of the spring member 118 is not to close the disc member 116 and aid the seal in closing the disc member 116; rather the spring member 118 is a biasing means, but typically does not generate enough force against the disc member 116 to cause it to seal (e.g., against/within port 120 of body member 112). Notwithstanding, it is contemplated that a spring member may be provided with biasing force for sealing as such.

Figure 16:
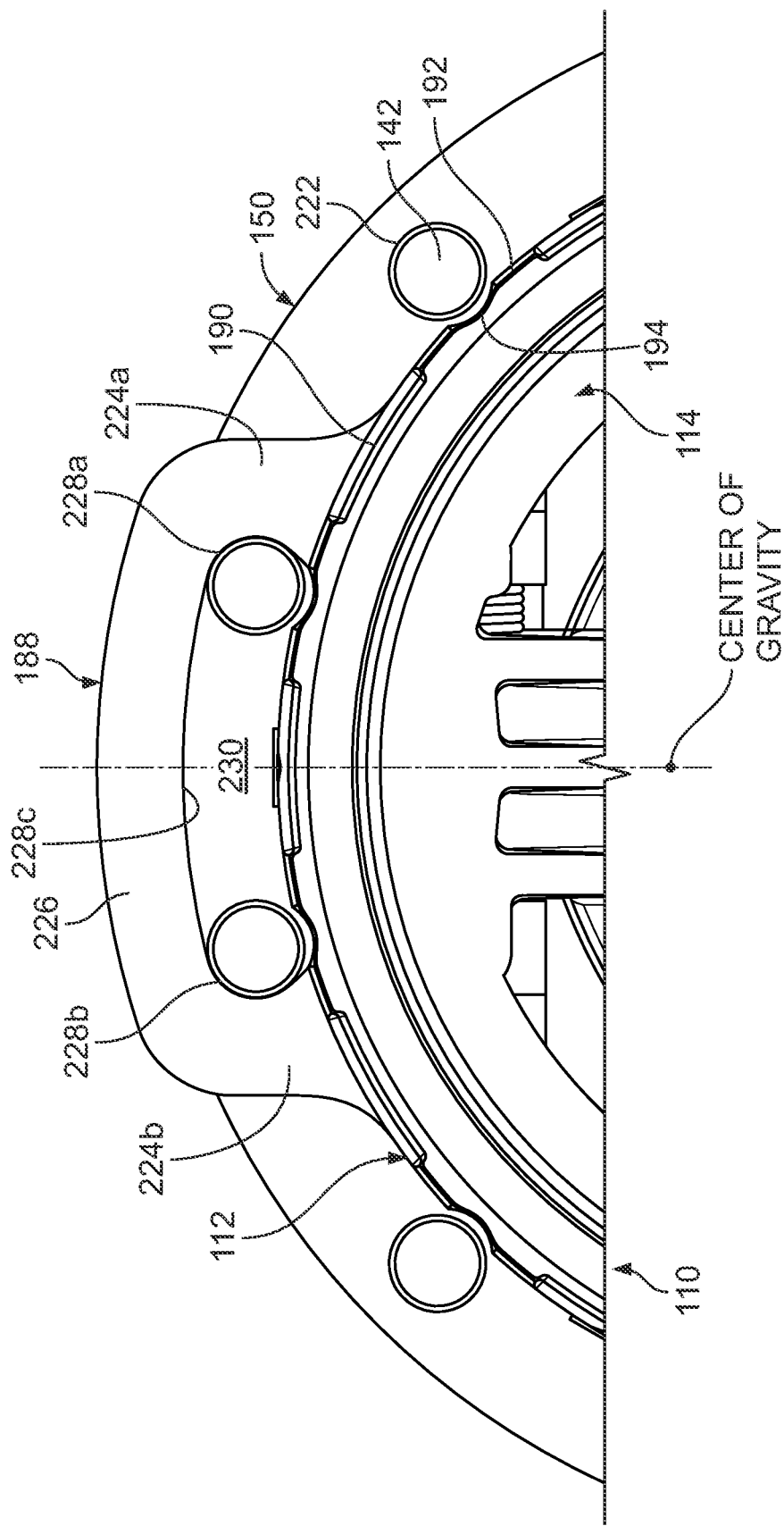
FIG. 16 is an enlarged partial front elevational view of the system of FIG. 7, illustrating details of an integral handle of the valve assembly in accordance with the present disclosure.

Referring now to FIG. 16, a partial front elevational view of the assembly 110 illustrating additional features of the integral handle portion 188 of the body member 112 is provided. As described in connection with FIGS. 7-9, the assembly 110 is secured between the mating flanges 150 by way of a plurality of bolts 142 and hex-head nuts 144. It is noted that the mating flange 150 proximate to the outlet flow opening 208 of the assembly 110 and the hex-head nuts 144 are omitted from FIG. 16 for clarity.

The assembly 110 includes a lower protrusion 220 extending from the exterior surface 206 of the body portion 112, which includes one or more bolt apertures 186 (see, e.g., FIG. 12). The protrusion 220 and the bolt apertures 186 are sized and configured such that one of the bolts 142 can pass through a bolt aperture 222 of the mating flange 150 proximate to the retainer member 114, a bolt aperture 186 of the body member 112, and a bolt aperture 222 of the mating flange 150 proximate to the body member 112. In other words, the protrusion 220 and the bolt apertures 186 of the body member 112 are sized and configured such that the bolt apertures 222 of the mating flanges 150 and the bolt apertures 186 of the body member 112 are substantially (e.g., coaxially) aligned when the assembly 110 is positioned between the mating flanges 150. Furthermore, those of ordinary skill in the art will understand that the mating flanges 150 can represent standardized (e.g., ISO) mating flanges (e.g., NPS "Nominal Pipe Size" or DN "diametre nominel") commonly utilized in piping systems. For example, mating flanges 150 can be standard 10" DN250 flanges, each having twelve (12) 22 mm bolt apertures 222 positioned radially about the flange, with each of the bolt apertures 222 being spaced 175 mm from a central axis of the flange. Of course, other standardized flange sizes can be utilized. Accordingly, the size and positioning of the bolt apertures 186 of the body member 112 can be defined by (e.g., configured to accommodate) standardized mating flanges.

The assembly 110 also includes a handle 188 extending from the exterior surface 190 of the body member 112. The handle 188 can be integrally formed with the body member 112 and can be positioned on the exterior surface 190, generally opposite the lower protrusion 220. Advantageously, the handle 188 can be grasped by a user during installation or transportation of the assembly 110. According to some embodiments of the present disclosure, the handle 188 can be positioned on the exterior surface 190 at a location that is substantially aligned with a center of gravity of the assembly 110 in order to enhance portability and manipulation thereof. For example, as shown in FIG. 16, the handle 188 can be centrally located on the body member 112 about a centerline of the assembly 110, given that the body member 112, retainer member 114, and disc member 116, are generally symmetrical from a front perspective view. However, as shown in FIG. 6, the handle 188 is located above the center of gravity of the assembly 110 (e.g., not being centrally located on the body member 112) in order to compensate for the weight of the retainer member 114 and disc member 116.

With continued reference to FIG. 16, the handle can include a first upright support member 224a and a second upright support member 224b (together upright support members 224), with a horizontal support member 226 spanning therebetween. A handle aperture 230 is defined by an internal surface 228a of the first lateral support member 224a, an internal surface 228b of the second lateral support member 224b, an internal surface 228c of the horizontal support member 226 and one or more of the exterior surface 190, the protrusions 192, and scalloped recesses 194 of the body member 112.

As shown, the internal surfaces 228a and 228b of the handle 188 are configured to substantially align with the bolt apertures 222 of the flanges 150 when the assembly 110 is engaged therewith. Furthermore, internal surfaces 228a and 228b of the handle 188 can have geometries configured to engage a bolt 142 extending through the handle 188. For example, at least a portion of the internal surfaces 228a and 228b can be arcuate surfaces having radii substantially equal to (e.g., having tolerances allowing for installation of the assembly 110) the outer diameters of the bolts 142. Accordingly, when the assembly 110 is installed, the bolts 142 engage or abut the internal surfaces 228a and 228b of the handle 188, thereby preventing axial rotation of the assembly relative to the flanges 150.

It should be understood that while the handle 188 is shown to span across and encompass two of the bolt apertures 222, the handle 188 can be configured to span across and encompass three or more bolt apertures 222 without departing from the spirit and scope of the present disclosure. As discussed above, the mating flanges 150 can be standardized (e.g., ISO) mating flanges (e.g., NPS "Nominal Pipe Size" or DN "diametre nominel") commonly utilized in piping systems. Accordingly, the geometry and radial positioning (e.g., spacing) of the internal surfaces 228a and 228b of the handle 188 can also be defined by (e.g., configured to accommodate) the standardized mating flanges 150 and accompanying bolts 142.

According to some embodiments, the handle 188 can also be configured to accommodate a user's hand(s), or a lifting/hoisting strap utilized during installation of the assembly 110. For example, the upright support members 224 can be configured such that the radial distance between the interior surfaces 228a and 228b thereof define a handle aperture 230 that is larger than the width of an average human hand (e.g., the handle aperture 230 spanning two, three, or more bolts 142 or bolt apertures 222), while still restraining axial movement of the assembly 110, as discussed above. However, it should also be understood that the (e.g., radial) spacing between the interior surfaces 228a and 228b of the upright support members 224 is defined by the radial spacing between, and the size of, the bolt apertures 222 of a given flange 150. For example, where a given (e.g., 12") flange has a radial distance between adjacent bolts of 4" and the width of the user's hand is also 4", then the interior surfaces 228a and 228b of the handle aperture 230 would span across two of the bolts 142, thereby providing a handle aperture 230 width of approximately 4", in order to accommodate the user's 4" wide hand. According to another example, where a given (e.g., 8") flange has a radial distance between adjacent bolts of 3", then the interior surfaces 228a and 228b of the handle aperture 230 would span across three or more of the bolts 142, thereby providing a handle aperture 230 width of approximately 6" (e.g., minus the diameter of a bolt 142/aperture 222) in order to accommodate the user's 4" wide hand, while also constraining axial movement of the assembly 100 relative to the flange. Where the handle 188 spans three or more bolts 142, the handle could include additional support members 224 to provide additional structural stability. Furthermore, where the handle 188 is configured to accommodate a user's hand, the internal surface 128c of the horizontal support member 226 could be configured to provide an improved purchase/grip thereon. For example, the internal surface 228c could be provided with knurling, or similar textured surface features, or could be contoured to accommodate the user's fingers.

As noted above, the lateral support members 224 include internal surfaces 228a and 228b having geometries configured to engage bolts 142 extending through the handle 188. However, it should be understood that internal surfaces 228a and 228b need not define the entire geometry of the support members 224. For example, the support members 224 (and handle aperture 230) can be configured to have a height that is greater that the outer diameter of a bolt 142. According to such example, first portions of the internal surfaces 228a and 228b could have geometries configured to engage the bolt 142 and second portions of the internal surfaces 228a and 228b could extend therefrom, providing for a handle aperture 230 having a height greater than the outer diameter of a bolt 142.

As discussed herein, a plurality of extended or raised portions 192 are radially positioned about (e.g., equidistantly from one another) the outer surface 190 of the body member 112 and generally extend perpendicular to the exterior mating face 134 and the mating face 174 of the body member 112. Each of the raised portions 192 includes a scalloped recess 194, which also extends perpendicular to the exterior mating face 134 and the mating face 174 of the body member 112. Furthermore, as shown in FIG. 16, each of the scalloped recesses 194 can be configured to align with and/or engage the plurality of bolts 142. As discussed above, the mating flanges 150 can be standardized (e.g., ISO) mating flanges (e.g., NPS "Nominal Pipe Size" or DN "diametre nominel") commonly utilized in piping systems. Accordingly, the geometry and radial positioning (e.g., spacing) of the raised portions 192 and scalloped recesses 194 can also be defined by (e.g., configured to accommodate) the standardized mating flanges. For example, the height of the raised portions 192 can be defined based the distance of the bolt apertures 222 from a central axis of the flange 150, such that the scalloped recesses 194 of the raised portions 192 can engage the bolts 142 extending through the bolt apertures 222. In other words, the raised portions 192, themselves, can have a height such that an upper surface thereof at least partially intersects the bolt apertures 222 of the mating flanges 150 (e.g., when viewed along a central axis thereof, as shown in FIG. 16). Furthermore, each of the scalloped recesses 194 can include semi-cylindrical concave surfaces having radii substantially equal to (e.g., having tolerances allowing for installation of the assembly 110) the outer diameters of the bolts 142. Accordingly, when the assembly 110 is installed, the bolts 142 can engage or abut the scalloped recesses of the body member 112, thereby preventing axial rotation of the assembly 110 relative to the flanges 150. According to some embodiments of the present disclosure, one or more of the of the scalloped recesses 194 can be aligned (e.g., coaxially) with one or more of the internal surfaces 228a and 228b and the one or more scalloped recesses 194 can have radii substantially equal to radii of the internal surfaces 228a and 228b, such that one or more of the scalloped recesses 194 and one or more of the internal surfaces 228a and 228b form a continuous circular sector from a point of view normal to central axes thereof (e.g., as shown in FIG. 16).

Figure 1:
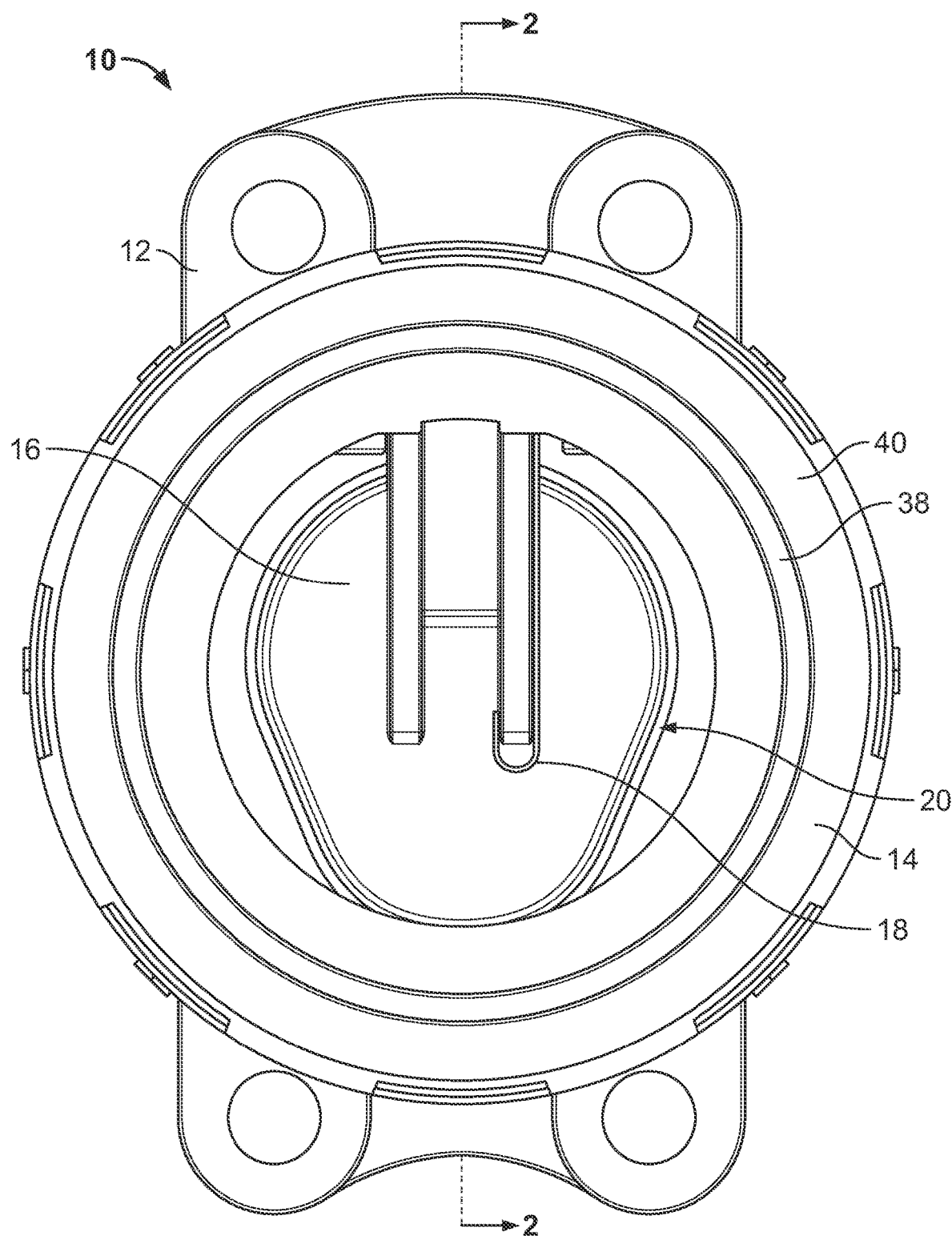
FIG. 1 is a front elevational view of a prior art wafer check valve assembly.
Figure 2:
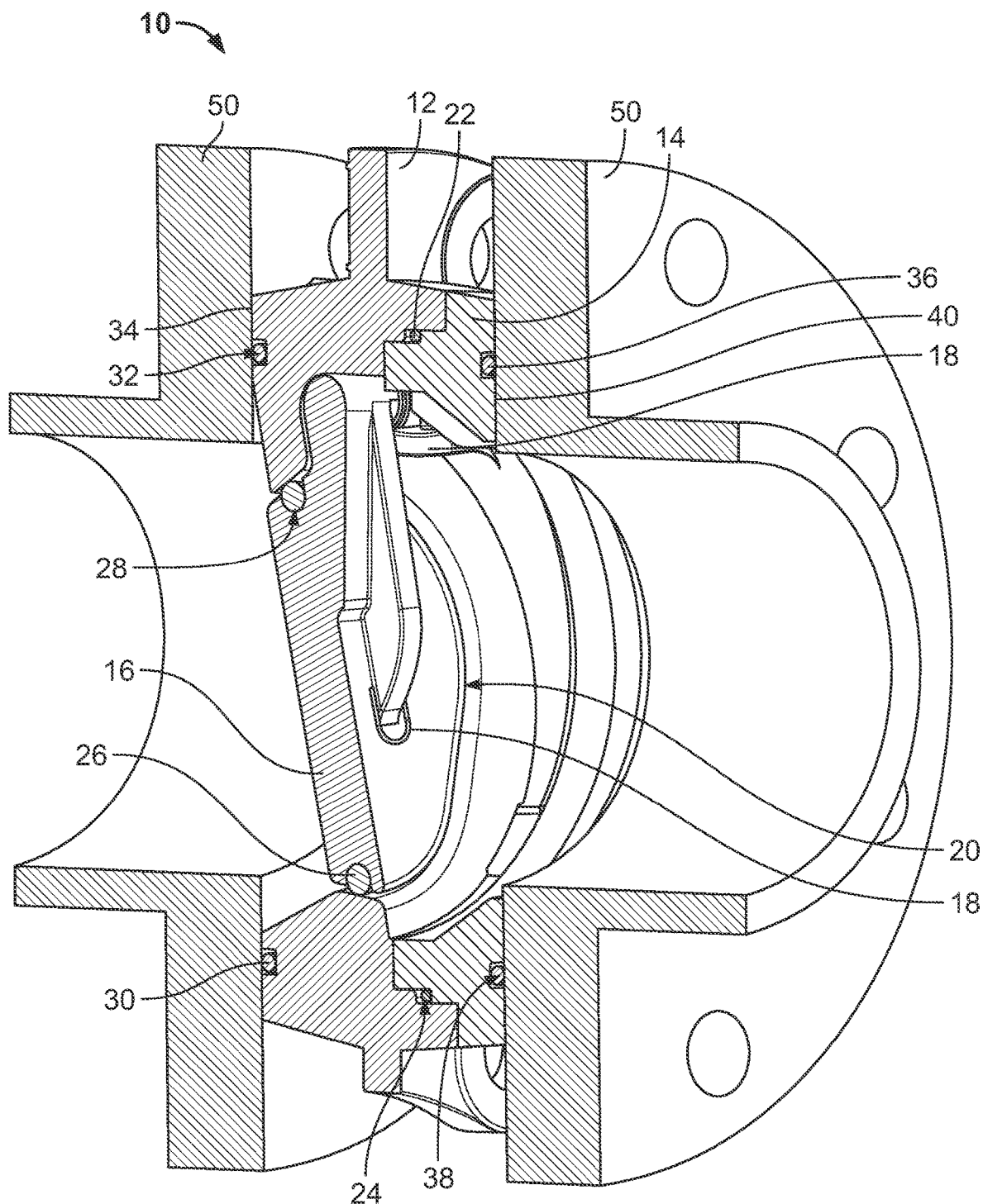
FIG. 2 is a cross-sectional view (taken along line 2-2 of FIG. 1) of the wafer check valve assembly of FIG. 1 positioned between two mating flanges of a piping system.

It is contemplated by the present disclosure that one or more features of the external construction of the assembly 110 (e.g., handle 188, protrusions 192, recessed scalloped areas 194, and related features) can be applied to prior art wafer check valve assemblies. It is also contemplated by the present disclosure that one or more internal construction features of prior art wafer check valves can be applied to the assembly 110. For example, the assembly 110 can include an internal configuration similar to the wafer check valve 10, discussed in connection with FIGS. 1 and 2 and described in greater detail by U.S. Pat. No. 8,887,757, the entire disclosure of which is hereby expressly incorporated by reference.

Having thus described the systems and assemblies of the present disclosure in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modi- fications, including those discussed above, are intended to be included within the scope of the disclosure.

What is claimed is:

1. A check valve assembly comprising:
a body having a substantially cylindrical exterior surface;
a valve assembly configured to engage a port of the check valve assembly; and
a handle integrally formed with the body and extending from the exterior surface thereof;
wherein the integral handle includes first and second vertical support members and a horizontal support member extending therebetween, the first vertical support member having a first interior surface, the second vertical support member having a second interior surface, and the horizontal support member having a third interior surface;
wherein the first, second, and third interior surfaces and the exterior surface of the body define a handle aperture; and
wherein the first and second interior surfaces of the handle aperture are configured to accommodate first and second bolts of a pipe flange fitting extending through the handle aperture.

2. The check valve assembly of claim 1, wherein the check valve assembly is a wafer check valve assembly.

3. The check valve assembly of claim 2, wherein the first and second interior surfaces of the handle aperture are configured to engage first and second bolts of a pipe flange fitting extending through the handle aperture, thereby preventing axial rotation of the check valve assembly with respect to the pipe flange fitting.

4. The check valve assembly of claim 3, wherein the substantially cylindrical exterior surface of the body includes one or more raised portions positioned radially thereabout, each of the one or more raised portions having a scalloped recess configured to engage a bolt of the pipe flange fitting extending through the handle aperture, thereby preventing axial rotation of the check valve assembly with respect to the pipe flange fitting.

5. The check valve assembly of claim 4, wherein the first interior surface of the handle aperture is aligned with a first scalloped recess of the one or more raised portions and the second interior surface of the handle aperture is aligned with a second scalloped recess of the one or more raised portions.

6. The check valve assembly of claim 2, wherein the handle aperture is sized and shaped to receive one or more of a human hand and a hoisting strap.

7. A check valve assembly comprising:
a body member having a substantially cylindrical exterior surface;
a retainer member having a substantially cylindrical exterior surface;
a valve assembly secured between the body member and the retainer member; and
a handle integrally formed with the body member and extending from the exterior surface thereof;
wherein the substantially cylindrical exterior surface of the body member includes one or more raised portions positioned radially thereabout, each of the one or more raised portions of the body member having a scalloped recess configured to engage a bolt of a pipe flange fitting coupled to the check valve assembly, thereby preventing axial rotation of the check valve assembly with respect to the pipe flange fitting, and
wherein the substantially cylindrical exterior surface of the retainer member includes one or more raised portions positioned radially thereabout, each of the one or more raised portions of the retainer member having a scalloped recess configured to engage a bolt of the pipe flange fitting coupled to the check valve assembly, thereby preventing axial rotation of the check valve assembly with respect to the pipe flange fitting.

8. The check valve assembly of claim 7, wherein the valve assembly is a wafer check valve assembly.

9. The check valve assembly of claim 8, wherein the scalloped recesses of the one or more raised portions of the body member are aligned with the scalloped recesses of the one or more raised portions of the retainer member.

10. The check valve assembly of claim 9, wherein the scalloped recesses of the body member and the scalloped recesses of the retainer member form one or more contiguous scalloped recesses spanning across the body member and the retainer member.

11. The check valve assembly of claim 10, wherein one or more contiguous scalloped recesses are configured to engage a bolt of the pipe flange fitting coupled to the check valve assembly, thereby preventing axial rotation of the check valve assembly with respect to the pipe flange fitting.

* * * * *